US005774071A

United States Patent [19]

Konishi et al.

[11] Patent Number: 5,774,071

[45] Date of Patent: Jun. 30, 1998

[54] ON-BOARD VEHICLE NAVIGATION APPARATUS

[75] Inventors: Hitoshi Konishi; Masayuki Arai; Tetsuya Kawakami, all of Wako, Japan

[73] Assignee: Honda Giken Kogyo Kabushiki Kaisha, Tokyo, Japan

[21] Appl. No.: 566,570

[22] Filed: Nov. 28, 1995

[30] Foreign Application Priority Data

Nov. 30, 1994 [JP] Japan .................................... 6-297690

[51] Int. Cl.[6] ..................................................... G08G 1/123

[52] U.S. Cl. ........................... 340/988; 340/995; 701/211

[58] Field of Search .................................... 340/988, 995, 340/990; 701/211, 208, 209

[56] References Cited

U.S. PATENT DOCUMENTS

| | | | |
|---|---|---|---|
| 4,882,696 | 11/1989 | Nimura et al. | 340/988 |
| 5,043,902 | 8/1991 | Yokoyama et al. | 340/988 |
| 5,067,082 | 11/1991 | Nimura et al. | 340/988 |
| 5,343,399 | 8/1994 | Yokoyama et al. | 364/449 |
| 5,371,497 | 12/1994 | Nimura et al. | 340/995 |
| 5,410,486 | 4/1995 | Kishi et al. | 364/449 |
| 5,416,477 | 5/1995 | Shibata | 340/988 |
| 5,465,089 | 11/1995 | Nakatani et al. | 340/995 |

*Primary Examiner*—Brent A. Swarthout
*Assistant Examiner*—John Tweel, Jr.
*Attorney, Agent, or Firm*—Lyon & Lyon LLP

[57] ABSTRACT

An on-board vehicle navigation apparatus which gives road directions to a driver which accurately describe the road conditions beyond an intersection at which to turn, without causing any confusion even if the route is complicated. A route planning section 9 determines a route based on the current position of the vehicle which is obtained through a current position determination section 2 and a destination assigned by a destination assignment section 10. The guide intersections which form this route are stored in a guide intersection memory 11. A route guidance section 12 continually monitors the current position of the vehicle and announces navigational instructions through a speaker 13 when the vehicle approaches a guide intersection. The type of navigational instruction is changed depending on the distance between the next two guide intersections through which the vehicle will pass.

4 Claims, 5 Drawing Sheets

MAP DATA MEMORY (1)
MAP DATA PREPARATION SECTION (6)
V-RAM (7)
DISPLAY (8)
GPS (3)
SPEED SENSOR (4)
GYRO (5)
CURRENT POSITION DETERMINATION SECTION (2)
ROUTE PLANNING SECTION (9)
GUIDE INTERSECTION MEMORY (11)
DESTINATION ASSIGNMENT SECTION (10)
ROUTE GUIDANCE SECTION (12)
13

1
Δ2=t2×v
Δ3=t3×v
Δ4=t4×v
S11
Dk1<300?
S12
NO
YES
S13
Dk1>50?
NO
S14
ARE THERE ANY OTHER INTERSECTIONS?
YES
YES
NO
S15
Ps=P−Δ2
S17
Ps=P−Δ3
Ps=P−Δ4
S19
VF=1
S16
VF=2
S18
VF=3
S20
S21
Ps<ERR?
YES
NO
S22
Ps<VOPN+1/2 ERR?
NO
YES
S23
Ps<Pb−ERR?
NO
YES
3
S24
VF?
1
2
3
S25
ANNOUNCEMENT OF SECOND INSTRUCTION
S26
ANNOUNCEMENT OF THIRD INSTRUCTION
S27
ANNOUNCEMENT OF FOURTH INSTRUCTION
2

ON-BOARD VEHICLE NAVIGATION APPARATUS

BACKGROUND OF THE INVENTION

1. Field of the Invention

The present invention relates to on-board vehicle navigation apparatus, especially to on-board vehicle navigation apparatus having the function of giving oral instructions regarding the direction to turn when a vehicle approaches an intersection.

2. Description of the Related Art

On-board vehicle navigation apparatus, provided with means to detect the current position of a vehicle and high-capacity memory devices such as CD-ROMs which store map data relating to road networks, which can notify a driver of the location on the map corresponding to the current position of the vehicle, are commonly known. Many types of on-board vehicle navigation apparatus having the ability to give navigational instructions orally have been suggested for the driver's convenience. With these types of on-board vehicle navigation apparatus with oral navigation functions, a route from the current position to the destination is automatically determined based on the map data once the driver specifies the desired destination. When the vehicle approaches an intersection while traveling along the suggested route, an oral navigational instruction is given as to whether to turn right or left at the intersection.

Of course, the driver of the vehicle, who is following the instructions of the navigation apparatus, may be unfamiliar with the conditions beyond the intersection. In order to heighten the awareness of the driver and to eliminate any anxieties, it is preferable to inform the driver of the conditions which await him upon turning at the looming intersection.

From this need, on-board vehicle navigation apparatus have been suggested which, when giving oral instructions as to the direction to turn when a traveling vehicle approaches a first intersection, at the same time gives oral instructions relating to a second intersection which is the next intersection at which to turn (for example, see Japanese Patent Application, First Publication No. 64-19615).

However, road networks have various forms; for example, there are cases in which the second intersection is located immediately after the first intersection, thus requiring repeated handling of the wheel in a short span of time. Therefore, such standardized instructions wherein instructions for both the first and second intersections are simply given upon approaching the first intersection cannot be said to be proper navigational instructions. Especially in regions which are criss-crossed by roads making complicated intersections in a limited amount of space, the driver needs proper instructions which accurately reflect the road conditions after turning at an intersection.

SUMMARY OF THE INVENTION

Taking the above situations into consideration, the present invention offers an on-board vehicle navigation apparatus which gives navigational instructions that accurately reflect the road conditions beyond a turn at an intersection, and has the ability to give navigational instructions without confusing the driver even if the route is complicated.

The vehicle navigation apparatus of the present invention comprises a road network memory device which stores road network data; a destination assignment means which assigns a destination for a vehicle; a guide intersection assignment means which assigns guide intersections to be passed in reaching the destination by using the road network data; an oral instruction means which orally indicates directions to turn when the vehicle nears the guide intersections; an intersection distance determination means which determines whether or not the distances between successive guide intersections among the guide intersections are less than a first standard distance; and an oral instruction addition means which, when the intersection distance determination means determines that the distance between successive guide intersections is less than the first standard distance, adds a first instruction relating to the further of the successive guide intersections to the oral instruction which is given upon approaching the nearer guide intersection.

According to the present invention, an oral guidance method for an on-board vehicle navigation system wherein guide intersections to be passed in reaching a pre-set vehicle destination are assigned based on road network data and the destination, and oral instructions as to turning directions of a vehicle are given when the vehicle approaches the guide intersections, comprises steps of determining whether a distance between successive guide intersections among the guide intersections is less than a first standard distance; and orally outputting the oral instructions with an additional first instruction relating to the further guide intersection upon approaching the nearer of the successive guide intersections when the distance between the successive guide intersections is less than the first standard distance.

With a preferred embodiment of the present invention, when a vehicle approaches a guide intersection, an oral instruction is given regarding the direction to turn at that intersection and the next guide intersection, the oral instruction reflecting the road intersection and distance conditions between the two guide intersections. According to the present invention, the oral instruction takes into consideration the distance between the two guide intersections and whether or not other intersections exist between the two guide intersections. According to another feature of the present invention, the oral instruction is timed based on the distance between the guide intersections and the speed of the vehicle.

Consequently, with the on-board vehicle navigation apparatus according to the present invention, even if the route is complicated, the driver receives proper navigational instructions without any confusion regarding the road to travel after turning at an intersection, because the navigational instructions accurately reflect the road conditions between successive guide intersections which lie before the vehicle.

PREFERRED EMBODIMENTS OF THE INVENTION

Hereinbelow, an embodiment of the present invention will be explained with reference to the drawings.

Figure 1:
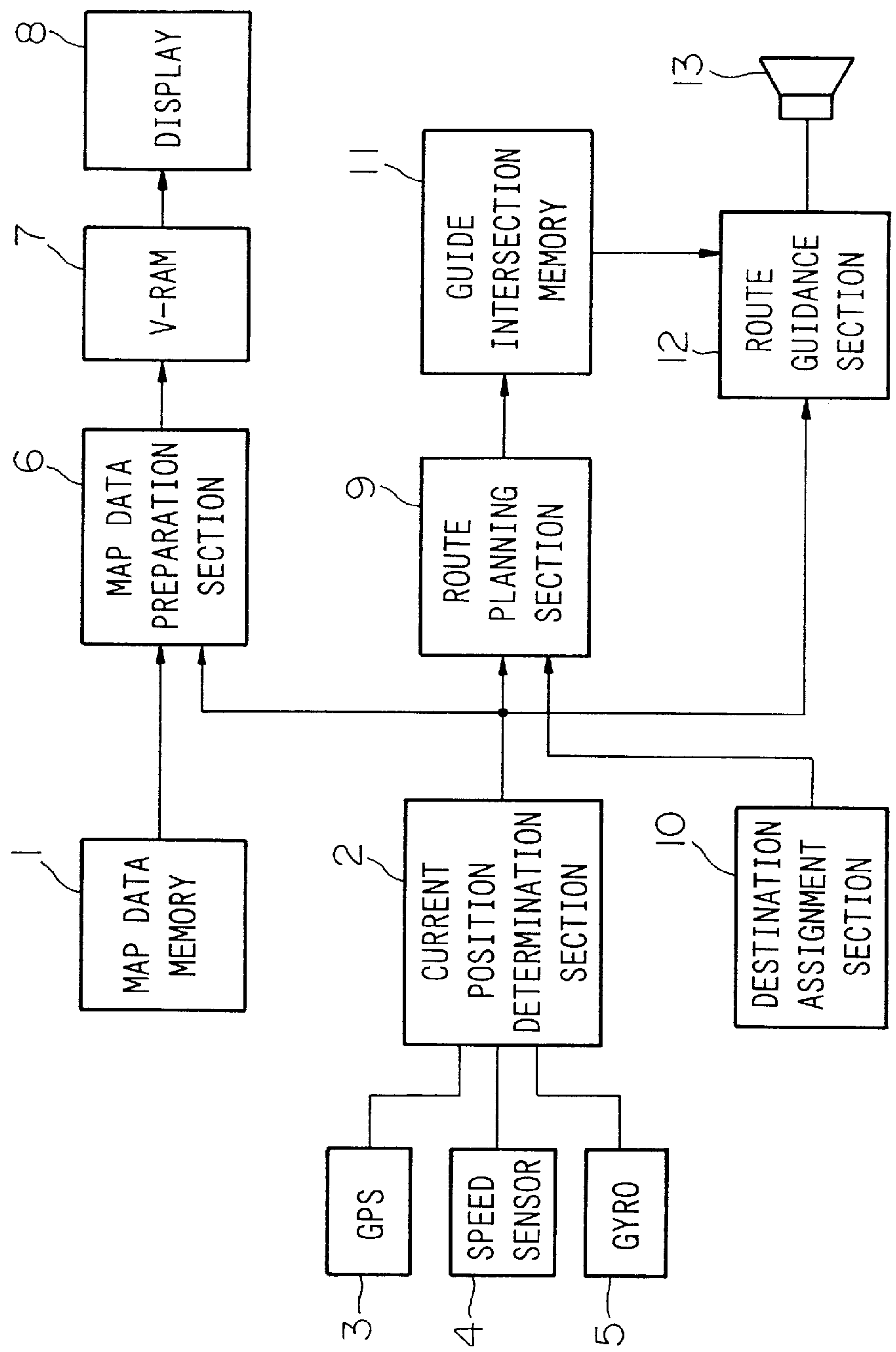
FIG. 1 is a block diagram illustrating the structure of an on-board vehicle navigation apparatus according to an embodiment of the present invention.

FIG. 1 is a block diagram showing the structure of an onboard vehicle navigation apparatus according to an embodiment of the present invention. In the diagram, reference numeral 1 denotes a map data memory, comprising a high-capacity memory device such as a CD-ROM, which stores map data indicating the conditions of a road network, i.e. the elements such as intersections which make up the road network as well as their locations, within a certain boundary area.

Reference numeral 2 denotes a current position determination section which determines the current position of the vehicle by repetitively calculating positional changes of the vehicle on the basis of data received from a gyro sensor 5 which measures the yawing velocity of the vehicle and a speed sensor 4 which measures the speed of the vehicle from the number of wheel rotations in a standard time period. Furthermore, the current position determination section 2 transmits data from a GPS 3 to confirm whether or not the current position value determined by the above-described method is correct.

Reference numeral 6 denotes a map data preparation section which selects map data of a standardized area containing the current position of the vehicle from the map data stored in the map data memory 1 and temporarily stores it to construct map data (video data) which displays the map of the standardized area and the current position of the vehicle on the map. The video data are written into a V-RAM (random-access memory for storage of video data) 7 and the video image is displayed on a display 8.

Reference numeral 9 denotes a route planning section which receives the destination of the vehicle from a destination assignment section 10, from which it searches for a route from the current position of the vehicle to the destination based on the map data stored in the map data preparation section 6. Then, from the intersections lying on the route, it selects intersections at which the vehicle should turn left or right. These selected intersections are assigned as guide intersections which require guidance as to the direction to turn, and data indicating the positions of each guide intersection are stored in a guide intersection memory 11.

Reference numeral 12 denotes a route guidance section which prepares navigational instructions required to guide the driver to the destination and orally announces them through a speaker 13. More specifically, this route guidance section 12 continually monitors the current position of the vehicle through the current position determination section 2 and continually monitors the relative position of the vehicle with respect to the guide intersections based on the data stored in the guide intersection memory 11. When it is detected that the vehicle is approaching one of the guide intersections, a navigational instruction notifying the direction to turn is announced through the speaker 13 as needed.

In the present embodiment, the route guidance section 12 has four types of navigational instructions for the case in which a right turn is required at the next intersection and a left turn is required at the following intersection. Of course, in the following guidance instructions, "right turn" and "left turn" are merely examples, and any of the instructions may be selected as is appropriate to the conditions in which they are used.

Instruction 1: "Right turn in approximately 500 m."

Instruction 2: "Right turn ahead."

Instruction 3: "Right turn ahead, followed by a left turn."

Instruction 4: "Right turn ahead, followed immediately by a left turn."

When the vehicle approaches a guide intersection, the route guidance section 12 selects the most appropriate instruction from the four given above, based on the road conditions between the guide intersections through which to pass, and announces it through the speaker 13.

Additionally, when the route guidance section 12 announces the navigational instructions, the announcement of the navigational instructions is controlled so that the announcements always end at a point which lies a standard distance ahead of the guide intersection regardless of the speed of the vehicle at that time. In controlling this timing, the times t1–t4 required for each announcement and the vehicle speed v received from the speed sensor 4 are considered.

(1) General Operation

Figure 2:
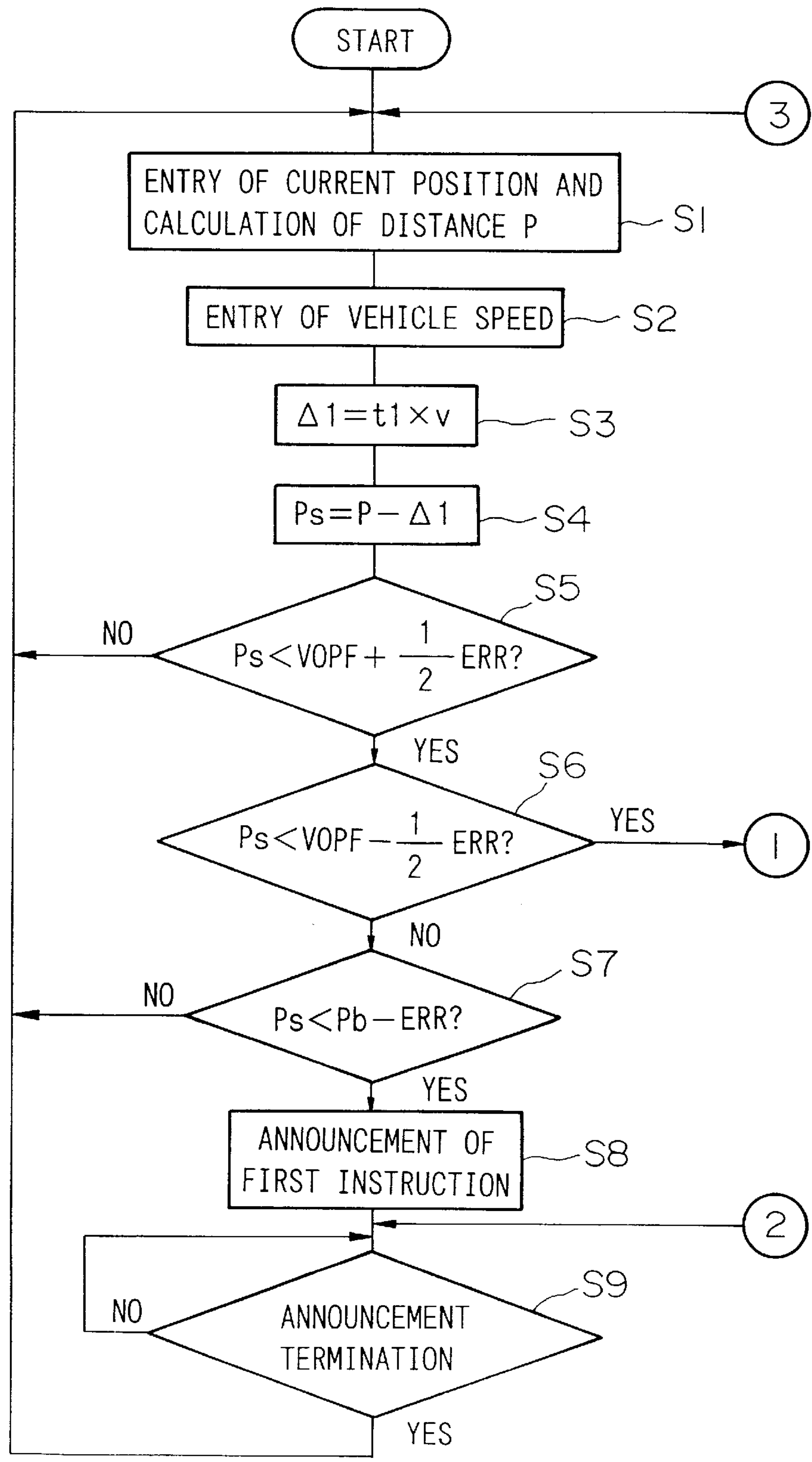
FIG. 2 is a flow chart showing the operations of the same embodiment.
Figure 3:
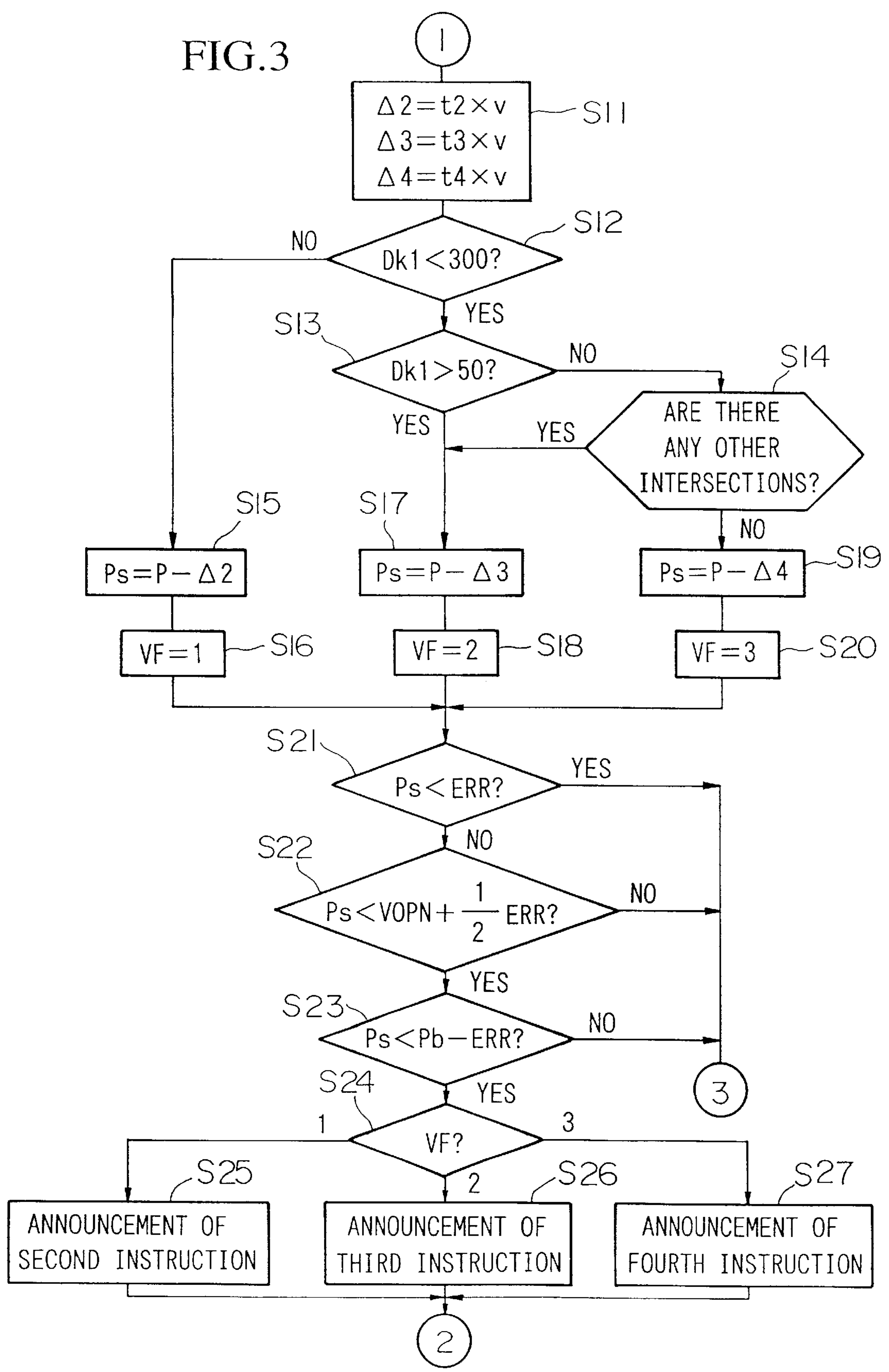
FIG. 3 is a flow chart showing the operations of the same embodiment.

Next, the operations of the present embodiment will be explained. In the on-board vehicle navigation apparatus according to the present embodiment, a video image of a map showing the current position of the vehicle is presented to the driver due to the actions of the current position determination section 2, the map data preparation section 6, the V-RAM 7 and the display 8. Additionally, when the driver has indicated a destination through the destination assignment section 10, the route planning section 9 searches for a route to the destination and the guide intersections on the route are assigned to the guide intersection memory 11. Then, the route guidance section 12 gives navigational instructions to the driver by repeatedly following the control programs shown in FIGS. 2 and 3. The operations of the route guidance section 12 by which navigational instructions are given will be explained below.

First, at step S1, the route guidance section 12 finds the current position of the vehicle through the current position determination section 2. Then, by referring to data stored in the guide intersection memory 11 relating to guide intersections, the distance P from the current position to the first guide intersection in the path of the vehicle is calculated. Next, advancing to step S2, the current velocity v of the vehicle is measured through the speed sensor 4. Advancing to step S3, the time t1 required to announce the first instruction is multiplied by the velocity v, thereby determining the distance Δ1 that the vehicle moves in the time it takes to announce the first instruction. Advancing then to step S4, the distance Δ1 is subtracted from distance P. With this subtraction, the distance Ps (hereinafter referred to as the remaining distance Ps) that would remain from the vehicle to the guide intersection after the instructions have finished, if the announcement of the first instruction is begun at the current time, is obtained.

Advancing next to step S5, it is judged whether or not the time is appropriate to begin the announcement of the first instruction. That is, the remaining distance Ps and a value which is the sum of a standard distance VOPF (VOPF=500 m in the present embodiment) and an allowable distance error (½) ERR are compared, and it is determined whether or not the former is smaller than the latter. If the result is "NO", then the procedure returns to step S1, and if "YES", then the procedure advances to step S6. At step S6, the remaining distance Ps and a value which is the difference between the standard distance VOPF and the allowable distance error (½) ERR are compared, and it is determined whether or not the former is smaller than the latter. If the result is "YES", then the procedure advances to step S11 (FIG. 3), and if "NO", the procedure advances to step S7.

Figure 4:
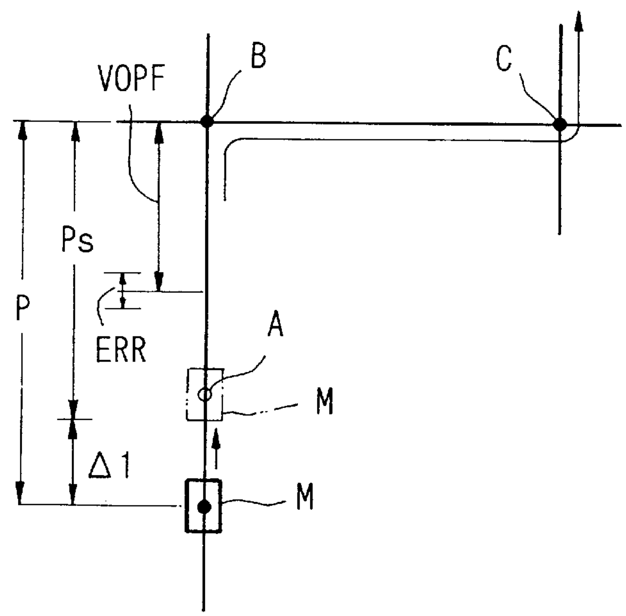
FIG. 4 is a map for explaining the operations of the same embodiment.

An example of the processing which occurs at steps S5 and S6 will be explained as follows. First, FIG. 4 shows a situation in which a vehicle M is advancing toward a guide intersection B and is to turn right at guide intersection B, then turn left at a guide intersection C. In this situation, vehicle M is sufficiently far from guide intersection B, and the remaining distance Ps to the guide intersection B is sufficiently longer than the standard distance VOPF. Therefore, as long as this situation is maintained, the result at step S5 would be "NO", the procedure would return to step S1, and the steps S1–S5 would be repeated.

Then, if the vehicle M advances to point A and the remaining distance Ps comes within the range of VOPF±(½)ERR, the result at step S5 would be "YES", the result at step S6 would be "NO", and the procedure would advance to steps S7–S9 (to be explained hereafter) which control the announcement of the first instruction.

Then, if the vehicle M further nears guide intersection B and the remaining distance Ps becomes shorter than VOPF−(½)ERR, the result at step S5 would become "YES", the result at step S6 would become "YES", and as a result the procedure would advance to step S11 (to be explained hereafter) which controls the announcement of the second through fourth instructions.

Then, after vehicle M has turned right at guide intersection B, the distance from the current position of the vehicle M to guide intersection C is determined to be the distance P (step S1), the remaining distance Ps corresponding to this distance P is calculated (step S4), and the remaining distance Ps and the standard distance VOPF (steps S5 and S6) are compared. Then, if the remaining distance Ps immediately after the vehicle M has turned right at guide intersection B is greater than VOPF−(½)ERR, once the processes for controlling the announcement of the first instruction have been performed (steps S7–S9), the processes for controlling the announcement of the second through fourth instructions (steps S11–S27) are performed as the vehicle M approaches guide intersection C. However, if the remaining distance Ps immediately after the vehicle M has turned right at guide intersection B is less than VOPF−(½)ERR, then the processes for controlling the second through fourth instructions (steps S11–S27) are performed without performing the processes (steps S7–S9) for controlling the announcement of the first instruction.

(2) Navigational Instructions When Far From a Guide Intersection (Control of First Instruction)

In the example shown in FIG. 4, the vehicle has reached point A; consequently, the result at step S6 is "NO" and the procedure advances to step S7. The operations for this case will now be explained. First, advancing to step S7, by referring to the map data stored in the map data preparation section 6, the distance Pb between the guide intersection B which the vehicle M is approaching and the intersection before the guide intersection B is determined. Then, the remaining distance Ps at that point is compared with the distance Pb with an allowable distance error ERR subtracted therefrom, it is determined whether or not the former is smaller than the latter, i.e. whether or not another intersection would exist between the vehicle M and the guide intersection B after a first instruction has been announced.

Figure 5A:
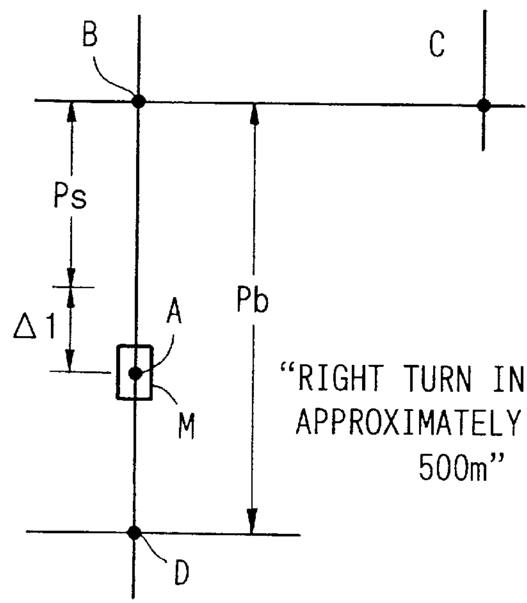
FIG. 5A and FIG. 5B are maps for explaining the operations of the same embodiment.

In this case, if the intersection D before the guide intersection B is behind the vehicle M and there are no other intersections between the vehicle M and the guide intersection B as shown in FIG. 5A, then Ps<Pb−ERR, and the result at step S7 would be "YES". Consequently, the procedure would advance to step S8, the route guidance section 12 would detect that a right turn is required at guide intersection B by referring to guide intersection memory 11, and a first instruction is prepared based on this result. Then, the first instruction, "Right turn in approximately 500 m." is announced through the speaker 13. While this first instruction is being announced, the vehicle has hypothetically neared the guide intersection B by Δ1. As a result, after the first instruction has been announced, the distance P from the vehicle M to the guide intersection B would ideally be VOPF.

Since the first instruction ends at a standard distance (500 m in the present embodiment) in front of the guide intersection without regard to the vehicle speed v, it is possible to accurately notify the driver of the remaining distance (500 m in this case) to the guide intersection. If the instruction termination point were to change according to various conditions such as the vehicle speed, the driver could develop a mistrust of the instructions. However, in the present embodiment, this type of apprehension would be avoided because the instruction always ends at a standard distance in front of the guide intersection without regard to the vehicle speed. The same applies to the second through fourth instructions as well.

After step S8, the procedure advances to step S9, where it is determined whether or not the announcement of the instruction has ended. If the result is "YES", then the procedure returns to step S1.

Figure 5B:
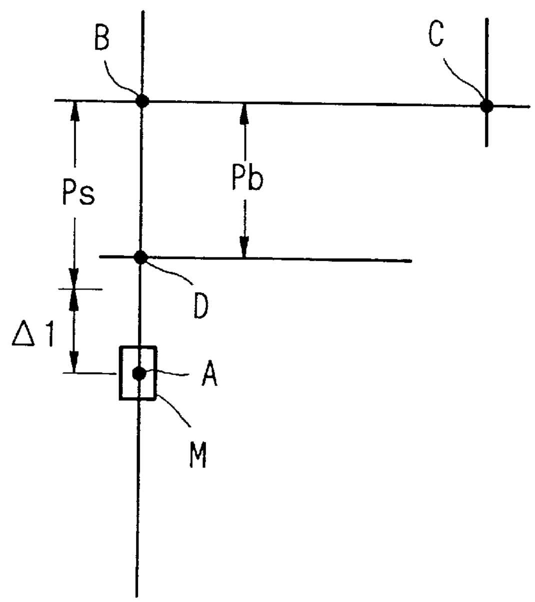

On the other hand, if the intersection D before the guide intersection B lies before the vehicle M as shown in FIG. 5B, then Ps>Pb−ERR and the result at step S7 becomes "NO". Consequently, the procedure returns to step S1 without the announcement of navigational instructions (step S8).

If the first instruction, "Right turn in approximately 500 m." were to be announced from speaker 13 in the case illustrated in FIG. 5B, there is the risk that the driver, upon hearing the first instruction, would mistakenly identify intersection D as the guide intersection B, since intersection D would lie in front of the vehicle M at the termination of the announcement. However, as explained above, there is no risk of such a misidentification with the present embodiment, since the first instruction is not announced if it is predicted that an intersection other than the guide intersection would lie in front of the vehicle upon termination of the announcement. Of course, even if navigational directions due to the first instruction are not given because of the existence of another intersection, suitable instructions are given upon further approaching the guide intersection B as will be explained below.

(3) Navigational Instructions When Approaching a Guide Intersection (Control of Second Through Fourth Instructions)

As explained above, if the vehicle M further nears the guide intersection B and the remaining distance Ps becomes less than VOPF−(½)ERR, the procedure advances through steps S5 and S6 to step S11 (see FIG. 3) which controls the announcement of the second through fourth instructions. The operations in this case are explained below.

First, upon advancing to step S11, the times t2–t4 required to announce the second through fourth instructions are multiplied by the vehicle speed v, thereby calculating the distances Δ2–Δ4 which the vehicle M travels while the second through fourth instructions are announced.

Figure 6A:
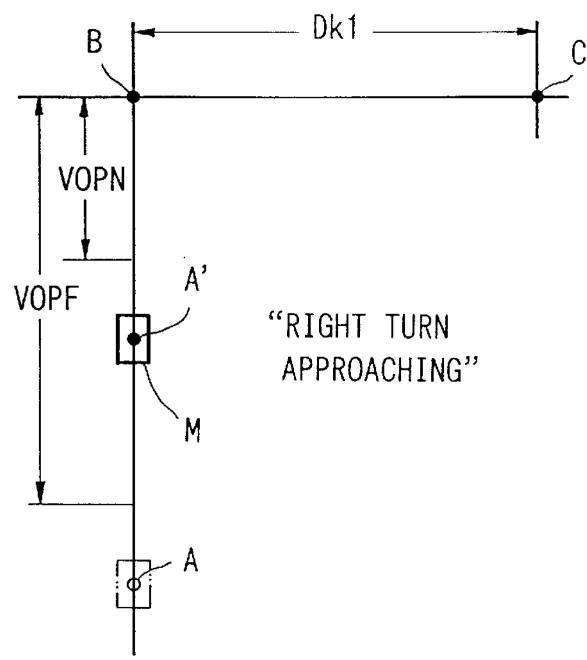
FIG. 6A through FIG. 6D are maps for explaining the operations of the same embodiment.

Advancing next to step S12, the distance Dk1 from the approaching guide intersection B to the next guide intersection is determined by referring to the map data stored in the map data preparation section 6, and it is determined whether or not this distance Dk1 is less than 300 m. If the result is "NO", the procedure advances to step S15, and if "YES", the procedure advances to step S13. If the next step is step S13, it is determined whether or not the distance Dk1 is longer than 50 m. If the result is "YES", then the procedure advances to step S17, and if "NO", the procedure advances to step S14. Advancing next to step S14, it is determined whether or not there is an intersection which is not a guide intersection (i.e. no turn is required) between the approaching guide intersection and the next guide intersection. If the result is "YES", then the procedure advances to step S17, and if "NO", the procedure advances to step S19.

a. When the Distance Between the Subsequent Two Guide Intersections is More Than 300 m:

FIG. 6A shows a situation wherein, during the determination of steps S12–S14, the distance Dk1 between the guide intersection B which the vehicle M is approaching and the next guide intersection C is large, i.e. more than 300 m. In this case, the procedure jumps from step S12 to step S15, where a remaining distance Ps is determined by subtracting a traveling distance Δ2 corresponding to the second instruction from the distance P from the current position of the vehicle M to the guide intersection B. Advancing next to step S16, a value "1" corresponding to the second instruction is set for a flag VF which indicates the navigational instruction to be announced.

Next, at step S21 it is determined whether or not the remaining distance Ps is smaller than the allowable distance error ERR. As long as the vehicle M is traveling at a normal speed, the result would not be "YES". However, if the result does happen to be "YES", then there is the risk that if the second instruction is initiated at that moment, the vehicle M may be extremely close to the guide intersection B or may have already passed guide intersection B when the announcement of the second instruction has ended. Therefore, in this case for the present embodiment, the procedure returns to step S1 without announcing the second instruction.

If the result at step S21 is "NO", then the procedure advances to step S22, where the remaining distance Ps is compared with a value which is the sum of a standard distance VOPN (for example VOPN=100 m), shorter than standard distance VOPF, with an allowable distance error (½)ERR, to determine whether or not the former is less than the latter. If the result is "NO", i.e. if the vehicle M would not reach a position in front of the guide intersection B by the distance VOPN upon termination of the announcement if the second instruction is initiated at that moment, then the procedure returns to step S1.

Then, if the vehicle M advances and reaches point A', thereby making the remaining distance Ps become less than VOPN+(½)ERR, then the procedure advances through steps S6, S11, S12, S15, S16 and S21 to step S22, where the result would be "YES" and the procedure would advance further to step S23.

Advancing then to step S23, similar to the procedure at step S7 which has previously been explained in detail, the distance Pb between the guide intersection B which the vehicle is approaching and the intersection therebefore is determined, and it is judged whether or not the remaining distance Ps is less than Pb−ERR. Then, if the result is "NO", i.e. if an intersection which the driver could mistakenly identify as the guide intersection B due to the announcement of the second instruction lies before the vehicle M, then the procedure returns to step S1, to advance again to step S23. On the other hand, if such an intersection which could cause confusion does not lie in front of the vehicle M, then the result at step S23 becomes "YES", and the procedure advances to step S24.

Advancing next to step S24, the content of the flag is determined. Since the value of the flag VF is "1" in this case, the procedure advances from step S24 to step S25. Then, the route guidance section 12 detects that a right turn is required at guide intersection B by referring to the guide intersection memory 11, and the second instruction "Right turn ahead." is announced through the speaker 13. While the second instruction is being announced, the vehicle M nears the guide intersection B by Δ2. As a result, if the procedure advances to step S24 while passing step S23 only once, then upon termination of the announcement of the second instruction, the distance from the vehicle M to the guide intersection B should be approximately equal to VOPN. Then, after step S24, the procedure returns through step S9 to step S1.

Figure 6B:
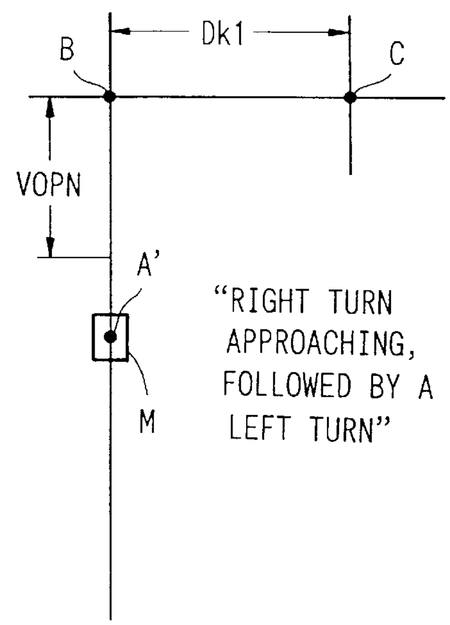

If the second instruction is announced as a result of the above control procedure, the announcement will end at a point in front of the guide intersection by a distance VOPN+(½)ERR if early, and if another intersection which can cause confusion lies in front of the vehicle, then the announcement will be delayed and will end at a point which lies before a point lying in front of the guide intersection by the distance ERR. The same applies to the third and fourth instructions which will be described later. The announcement control of the second through fourth instructions is different from the control of the announcement termination point of the first instruction in that there is the possibility that the announcement termination point could be shifted. The reason for this is that while the first instruction is meaningless unless the announcement ends precisely at a standard distance in front of the guide intersection, the second through fourth instructions contain required navigational directions, so it is necessary to present them to the driver before reaching the guide intersection even if the vehicle has already passed the standard distance in front of the guide intersection.

b. When the Distance Between the Next Two Guide Intersections is Between 50 m and 300 m:

FIG. 6B shows the case in which the distance Dk1 between the guide intersection B which the vehicle M is approaching and the next guide intersection C is determined to be between 50 m and 300 m in steps S12–S14 described above. In this case, the procedure advances through steps S12 and S13 to step S17, where the remaining distance Ps, which is the distance P from the current position of the vehicle M to the guide intersection B subtracted by the traveling distance Δ3, is determined. Advancing next to step S18, a value "2" corresponding to the third instruction is set for the flag VF which indicates the navigational instruction to be announced.

Figure 6C:
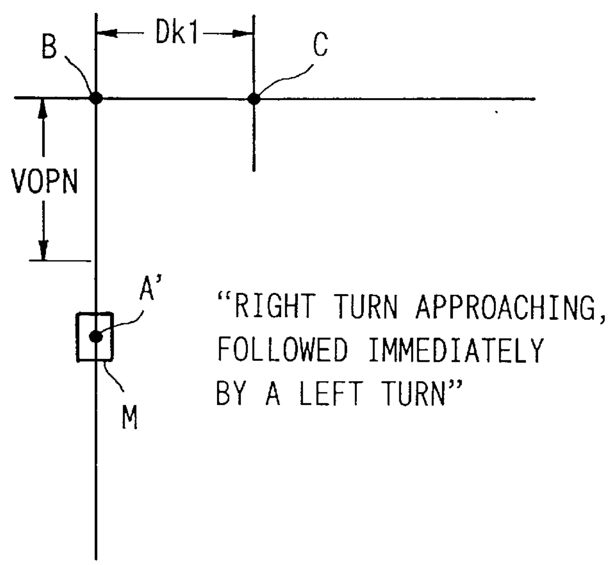

Then, similar to the procedure in section a above, the procedure advances through steps S21, S22 and S23 to step S24, then moves on to step S26. Then, the route guidance section 12 detects that a right turn is required at guide intersection B and a left turn is required at the next guide intersection C by referring to the guide intersection memory 11, consequently announcing the third instruction "Right turn ahead, followed by a left turn." from speaker 13. At approximately the same time the announcement of this third instruction ends, the vehicle M should pass a point which is a distance VOPN in front of the guide intersection B. Then, when step S26 has been completed, the procedure returns through step S9 to step S1.

c. When the Distance Between the Next Two Guide Intersections is Less Than 50 m:

FIG. 6C shows a situation in which the distance between the next two guide intersections in front of the vehicle M is less than 50 m according to the determinations made in steps S12–S14. In this case, the procedure advances through steps S12 and S13 to step S14. Then, if there is not other intersection between guide intersections B and C, then the result of step S14 is "NO" and the procedure advances further to step S19. At step S19, the remaining distance Ps, which is the distance P from the current position of the vehicle M to the guide intersection B subtracted by the traveling distance Δ4, is determined. Advancing then to step S20, a value "3" corresponding to the fourth instruction is set for the flag VF which indicates the navigational instruction to be announced.

Then, as in sections a and b described above, the procedure advances through steps S21, S22, and S23 to step S24, then jumps to step S27. Consequently, the route guidance section 12 announces the fourth instruction, "Right turn ahead, followed immediately by a left turn." through the speaker 13.

Figure 6D:
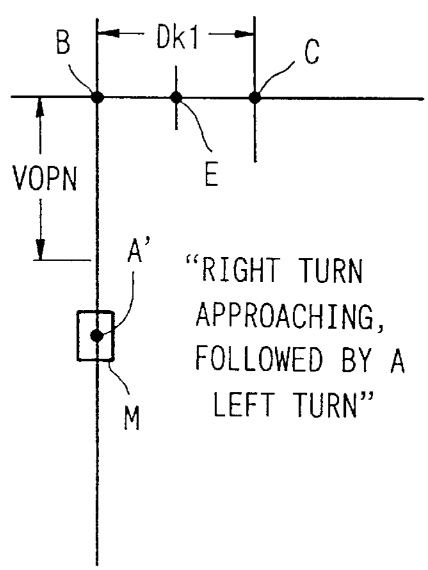

In this way, when the distance between the next two guide intersections is less than 50 m, the driver is notified that the next turn is ". . . followed immediately by a left turn." instead of simply being ". . . followed by a left turn." As a result, the driver is notified beforehand that upon turning the wheel at guide intersection B, another wheel operation is required immediately thereafter, thus allowing unpanicked handling of conditions which require complex wheel operations in a short span of time.

d. When the Distance Between the Next Two Guide Intersections is Less Than 50 m and Another Intersection Exists Between the Guide Intersections:

FIG. 6D shows a case in which another intersection E exists between the next two guide intersection B and C in front of the vehicle M. In this case, if the fourth instruction, "Right turn ahead, followed immediately by a left turn." is announced through the speaker 13 when the vehicle M has reached point A', there is the risk that upon turning right at guide intersection B, the driver could mistakenly turn left at the intersection E which immediately follows instead of guide intersection C.

In the present embodiment, such a situation results in a "YES" at step S14, and the procedure thereby advances through steps S17 and S18 to steps S21–S24. As a result, by advancing through steps S24–S27, the third instruction, "Right turn ahead, followed by a left turn." is announced by the speaker 13.

Thus, even if the distance between the next two guide intersections is less than 50 m, if there is another intersection between the guide intersections, the driver is notified that the next turn is simply ". . . followed by a left turn." instead of being ". . . followed immediately by a left turn."

While in the above-described embodiment, the determination of the distance between a guide intersection through which the vehicle is to pass and the next guide intersection, as well as the determination of the existence of other intersections between these guide intersections, are made while the vehicle is approaching the guide intersection, all or some of these values can be pre-determined during the planning of the route and stored, with the information being referred to upon approaching the guide intersection.

We claim:

1. An on-board vehicle navigation apparatus, comprising:

a road network memory device which stores road network data;

a destination assignment means which assigns a destination for a vehicle;

a guide intersection assignment means which assigns guide intersections to be passed in reaching said destination by using said road network data;

an oral instruction means for providing an oral instruction which orally indicates directions to turn when said vehicle nears a first next guide intersection of the assigned said guide intersections from a current position of said vehicle;

a remaining distance determination means which determines whether or not the distance between a present position of the vehicle and said first next guide intersection is less than a first standard distance and a second standard distance which is shorter than the first standard distance:

an intersection distance determination means which determines whether or not the distance between said first next guide intersection and a second next guide intersection immediately subsequent to said first next guide intersection among said guide intersections is less than a third standard distance; and an oral instruction addition means which, when the remaining distance determination means determines that the distance between the present vehicle position and said first next guide intersection is less than the second standard distance and when the intersection distance determination means determines that the distance between said first next guide intersection and said second next guide intersection is less than said third standard distance, adds a first additional oral instruction relating to said second next guide intersection to an original oral instruction which is given upon approaching said first next guide intersection;

wherein said oral instruction addition means adds a second additional oral instruction instead of said first additional oral instruction when the distance between said first next guide intersection and said second next guide intersection is less than a fourth standard distance which is less than said third standard distance, and said second additional oral instruction indicating an urgency of a vehicle maneuver required at said second next guide intersection, which urgency is not indicated by said first additional oral instruction.

2. An on-board vehicle navigation apparatus according to claim 1, wherein said oral instruction addition means is provided with an additional instruction changing means that changes said second additional oral instruction to said first additional oral instruction when another intersection exists between said first next guide intersection and said second next guide intersection even when the distance between said first next and second next guide intersections is less than said fourth standard distance.

3. An oral guidance method for an on-board vehicle navigation system wherein guide intersections to be passed in reaching a pre-set vehicle destination are assigned based on road network data and said destination, and oral instructions as to turning directions of a vehicle are given when said vehicle approaches said guide intersections, comprising steps of:

determining whether the distance between a present position of the vehicle and a first next guide intersection is less than a first standard distance and a second standard distance which is shorter than the first standard distance:

determining whether a distance between said first next guide intersection and a second next guide intersection immediately subsequent to said first next guide intersection among said guide intersections is less than a third standard distance;

when the distance between the present position of the vehicle and said first next guide intersection is less than the second standard distance, orally outputting said oral instructions with a first additional instruction relating to said second next guide intersection upon approaching said first next guide intersection when the distance between said first next guide intersection and said second next guide intersection is less than said third standard distance; and orally outputting said oral instructions with a second additional instruction instead of said first additional instruction when the distance between said first next guide intersection and said second next guide intersection is less than a fourth standard distance which is less than said third standard distance, wherein said second additional instruction indicated an urgency of a vehicle maneuver required at said second next guide intersection which urgency is not indicated by said first additional instruction.

4. An oral guidance method for an on-board vehicle navigation system according to claim 3, wherein said first additional instruction is added instead of said second additional instruction when another intersection exists between said first and second next guide intersection even when the distance between said first next guide intersection and said second next guide intersection is less than said fourth standard distance.

* * * * *